United States Patent [19]

Hynds

[11] Patent Number: 5,421,717

[45] Date of Patent: Jun. 6, 1995

[54] APPARATUS FOR FORMING THREADED MOLDED ARTICLES

[75] Inventor: John C. Hynds, Etobicoke, Canada

[73] Assignee: Husky Injection Molding Systems Ltd., Bolton, Canada

[21] Appl. No.: 251,602

[22] Filed: May 31, 1994

[51] Int. Cl.$^6$ .............................................. B29C 45/44
[52] U.S. Cl. .................................... 425/556; 264/334; 425/809; 425/DIG. 58
[58] Field of Search ............... 425/556, 554, 438, 809, 425/DIG. 58; 264/334

[56] References Cited

U.S. PATENT DOCUMENTS

| | | | |
|---|---|---|---|
| 4,155,698 | 5/1979 | Aichinger | 425/556 |
| 4,496,302 | 1/1985 | Brown | 425/556 |
| 4,652,227 | 3/1987 | Aoki | 425/556 |
| 5,281,385 | 1/1994 | Julian | 425/556 |
| 5,368,469 | 11/1994 | Ekkert | 425/556 |

Primary Examiner—Tim Heitbrink
Attorney, Agent, or Firm—Bachman & LaPointe

[57] ABSTRACT

A device and process for forming threaded molded articles includes first and second mold halves having mold surfaces which are adapted to form a molded plastic article. The first mold half cooperates with the second mold half to form a mold cavity in a mold closed position. A nozzle for injecting plastic material into the mold cavity and a power source for relatively moving the first mold half to a position spaced from the second mold half to form a mold open position, are provided. The device also includes a movable ejection mechanism for loosening the article from the mold surface of the second mold half and for ejecting the article from the mold surface of the second mold half while in the open position. A moving mechanism is connected with the movable ejection mechanism for transmitting power to and inducing motion of said ejection mechanism. An initial source is included which converts the relative motion of the mold halves into power for powering the transfer mechanism. The initial source provides power sufficient to enable the ejection mechanism to break the article loose from the mold surface of the second mold half. A secondary source is provided for powering the moving mechanism after the article is broken loose, for finishing the ejection of the article from the second mold half.

12 Claims, 10 Drawing Sheets

APPARATUS FOR FORMING THREADED MOLDED ARTICLES

BACKGROUND OF THE INVENTION

This invention relates to injection molding machines, and more particularly, to an improved method and apparatus for forming a molded article and removing the same from the mold.

The molding of articles having outer and inner peripheral features such as threads, lips, tabs or the like, is well known in the molding industry. Generally, a female mold and a mold core are used for molding such articles wherein molten plastic or the like is injected between the core and female mold for creating the desired configuration. Once molding has taken place, it is a necessary feature of injection molders to have an ejection mechanism which removes the molded article from the mold. Because molds generally include a large number of cavities, it is frequently the case that the ejection mechanism operates in some manner to eject the articles as a group.

A particular use for ejection mechanisms is derived from the manufacture of molded closures having threads on the inner surface thereof. In these processes, the female mold is configured to form the outer portion of the closure while the mold core is configured to form the inner portion of the closure which includes a threaded surface. Once the article is molded, the female mold and mold core are separated so as to initiate the release of the article from the mold. Because of the engaging nature of threads, the article stays with the mold core upon separation of the mold halves. Accordingly, a mechanism is typically required which functions with the mold core for removing the threaded molded article from the outer surface of the mold core.

The art includes a variety of devices and methods for removing threaded closures or the like from a mold. A common denominator between most of the devices discussed below, is the necessity for an initial force for breaking or loosening the article away from the mold which is generally significantly larger than the force required for finally ejecting the article. Accordingly, a common disadvantage of ejection devices and methods currently available, is the fact that large sources of power are necessary for initiating the ejection process which is then used inefficiently thereafter for finishing the ejection process. As a result, a large force is used for the entire ejection process where only the initiation of the process requires such a large force. The requirements for large forces naturally requires larger devices for providing these forces. As such, excessively large hydraulic cylinders or other means for power supply are used in these devices.

The art of injection molding plastic closures is well known in the industry. Dependant upon the design of the plastic closure, including the thread type and number of complete threads, it may be ejected from the mold in a variety of ways. If the plastic material being molded is flexible or resilient it may be stripped by a commonly known stripper ring pushing the article off the core. The molded part must be solidified enough not to be folded over onto itself during ejection but sufficiently elastic to return to essentially its original molded shape after the threads have been stretched over the core. If the molded material does not possess the appropriate characteristics of flexibility for this most economical and simple method of ejection, the article will be damaged or may not return to its original shape and size. Similarly, a very defined or deep thread profile may be inherently prone to stripping damage. Also, the part may have other delicate or fragile features such as a commonly known tamper evident ring, which could be damaged even if an otherwise acceptable plastic is being injection molded.

When molding a plastic resin which is too rigid to be stripped from the threaded portion of the cavity, without permanent deformation of the molded article, one may use a method as shown in U.S. Pat. No. 4,652,227. In this patent, an unscrewing chuck is used to come over the molded part once the female portion of the cavity is removed. The chuck grasps the outer feature of the closure, then rotates the closure as it moves slidably backward to facilitate the axial movement of the unscrewing closure. This method has the advantage of a simpler mold design which requires no moving parts for ejection of the article; however, the unscrewing system can become quite complicated and costly as it is virtually a machine unto itself. The chuck is actuated by an electric motor which axially moves and rotates the chuck. The power of the electric motor is essential for initially breaking the article from the mold. However, such power is unnecessary for the remaining ejection process. Also, the electric motor takes up a large amount of room adjacent the molding device and thereby substantially limits the number of mold cavities which can be used.

Another method of unscrewing is accomplished by first separation of the mold halves (opening the mold), then rotating the core portion of the mold cavity while a stripper ring or bottom forming portion of the cavity moves slidably forward in timed relationship with the axial movement of the closure, until the closure is clear of the core portion and allowed to fall free from the molding area. The stripper ring will often employ protruding features, such as teeth or notches, which will keep the molded article from turning in the direction of the rotating core. The stripper ring may be moved forward by a sliding cam attachment that is linked to the rotation drive of the core, thereby ejecting the closure from the core.

This approach carries with it various disadvantages and short-comings. If the core rotation and stripper ring plate movement are directly linked to a motive means which in turn is not directly linked to the mold closing means, there is the likelihood of collision damage should the mold closing means complete its task before the stripper ring return means. To eliminate this possibility, the stripper ring return means must be completed in sequence before the mold closing begins. These non-simultaneous movements can undesirably add one or two seconds to the entire mold cycle time. In addition, the rotation drive must be of sufficient power to break the molded article from the mold. Thus, as discussed above, a large initial force is required in comparison to a smaller finishing force. With one rotation device turning the core and stripper ring, typically one excessively large force is used inefficiently for the finishing portion of the ejection process.

There exists, therefore, a need in the injection molding field, for an ejection device having an initial power source for supplying a large force required for breaking a molded article loose of its mold, which is then replaced by a less powerful source for completing the ejecting process.

SUMMARY OF THE INVENTION

The primary object of this invention is to provide a system and process for molding articles and ejecting the articles from the mold.

Another object of this invention is to provide a system and process for removing threaded molded articles from a mold core of a molding device.

Yet another object of this invention is to provide an ejection system and process for providing an initial force for starting ejection while providing a secondary source for ending the ejection.

Still another object of this invention is to provide a system and process which functions to reduce the size of the power source needed for ejecting the molded articles from the mold cavities and consequently reduce space usage.

And still another object of this invention is to provide a system and process which converts the power source used to open mold halves into the initial power source for overcoming the strong opposing forces holding a molded article in the mold.

The foregoing objects are attained by the inventive device and process for forming threaded molded articles which includes a first mold half having a molding surface for the formation of a molded plastic article; a second mold half having molding surface cooperating with the first mold for forming a mold cavity when the mold is in the mold closed position; means for injecting plastic material into the mold cavity; motive means for causing relative motion between the first and second mold halves to space the first half from the molded article and the second half, forming a mold open position; a movable ejection means positioned in the second mold half for breaking the article loose from the mold surface and the second mold half and for ejecting the article from the mold surface of the second mold half while in the open position; ejection moving means connected with the movable ejection means for transmitting power to and inducing motion of the ejection means; initial source means for converting the relative motion into power for powering the ejection moving means, the initial source means providing power sufficient to the ejection means to break the article loose from the mold surface of the second mold half; and secondary source means for powering the ejection moving means, wherein the secondary source provides sufficient power to the ejection means for finishing the ejection of the article after the article is broken loose from the second mold half.

One embodiment of the invention includes the initial source means being comprised of a cam connected with the female mold and a cam following mechanism being connected with the ejection moving means. As such, the motive means for causing relative motion of the mold halves causes the cam following mechanism to move upwardly on the cam and energize the ejection moving means while the female mold and mold core are being separated. In the same embodiment, the ejection moving means includes a rack and pinion mechanism which is engagable with the ejection means which is preferably a stripper ring, which is movable from a rearward to a forward position in order to remove the threaded article from the mold core. The secondary source for finishing the ejection process is preferably a pneumatic cylinder.

The details of the present invention are set out in the following description and drawings wherein like reference characters depict, like elements.

DETAILED DESCRIPTION OF THE PREFERRED EMBODIMENT

Figure 1:
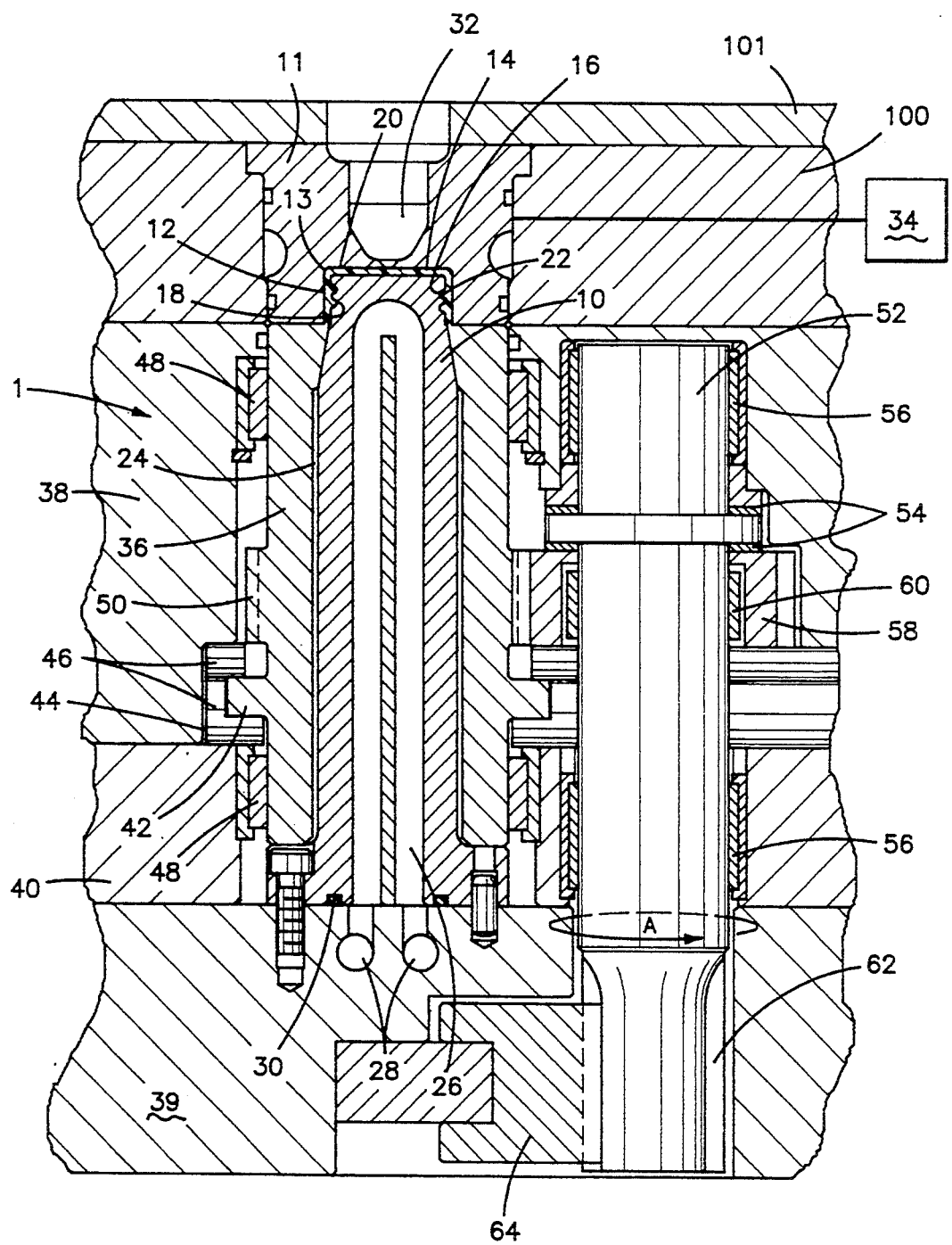
FIG. 1 is a sectional view of a core and mold assembly in the mold closed position.

FIG. 1 shows the ejection portion of the apparatus of the present invention comprising a mold cavity assembly 1 in the mold closed position including first and second mold halves, mold core 10 cooperating with female mold 11 to form a mold cavity 12 therebetween. Female mold 11 has a first mold surface 13 for the formation of the outer surface of molded plastic article 14 formed in mold cavity 12. Mold core 10 has a grooved second mold surface 16 adjacent mold cavity 12 in the mold closed position for the formation of a threaded inner surface 18 on molded article 14. Naturally, the particular threaded design may vary depending on requirements.

Molded article 14 may be a threaded closure or cap with a flat, shaped or open upper portion 20 and depending skirt portion 22.

Mold core 10 is an elongated hollow core with an external core surface 24 having cooling channels 26 therein supplied by cooling inlet means 28 in fixed core plate 39 for introducing a cooling fluid, as water, into the cooling channels so that the mold core and molded article may be rapidly cooled. A static O-ring type water seal 30 may surround the cooling passages. Because the mold core is stationary, its design features permit a cooling channel or channels of maximum size for greatest efficiency in the solidification of the plastic product. Furthermore, the seal 30 is static and not prone to wear or leak.

Injection means 32 are provided for injecting molten plastic material into mold cavity 12, as an injection nozzle fed from a source of molten plastic (not shown)

for the formation of molded article 14 in the mold cavity. Motive means 34, for causing relative motion between the mold halves, shown schematically in FIG. 1, are provided for moving mold 11 towards and away from mold core 10 to respectively form the mold closed (FIG. 1) position and mold open (FIG. 2) position. As shown in FIG. 1, the molded article 14 desirably has a smooth external surface but may also have axial serrations or the like so that the motive means 34 is operative to move mold 11 axially, in a straight line, towards and away from mold core 10.

Annular stripper ring 36 is fitted over the external core surface 24 and is retained between the front bearing plate 38 and rear bearing plate 40 by sandwiching the flange portion 42 of stripper ring 36 in front of bearing plate recess 44 using wear plates 46 and functions as a movable ejection mechanism. Centering alignment of stripper ring 36 is provided by needle bearing 48 placed on opposite ends of the stripper ring. The stripper ring also has gear teeth 50 which are used for rotational driving of the stripper ring. The gear teeth are preferably located midway between the needle bearings for best support.

Figure 2:
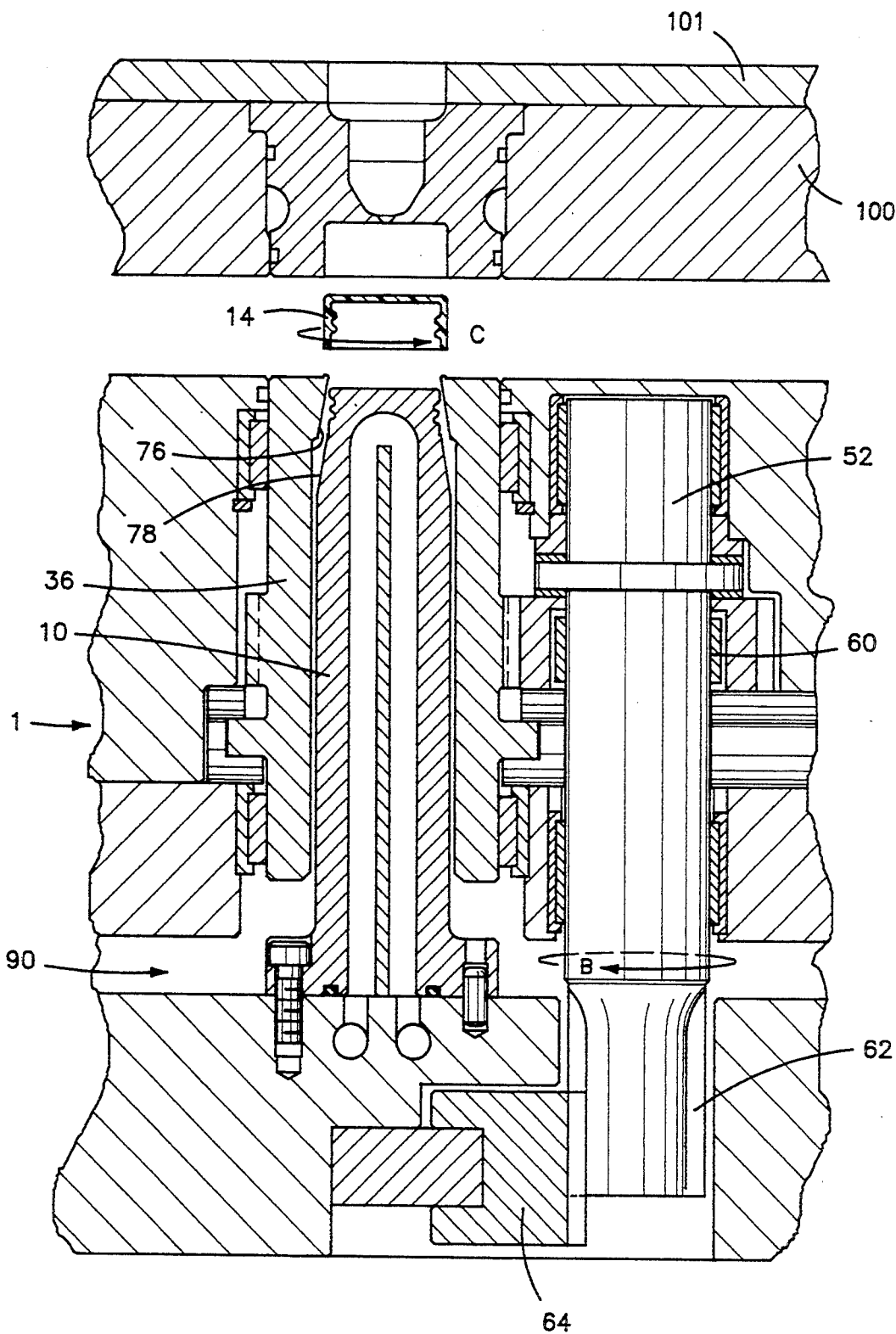
FIG. 2 is a view similar to FIG. 1 in the mold open position.

Referring still to FIGS. 1 and 2, pinion 52 is fitted in the front 38 and rear 40 bearing plates using thrust bearings 54 and needle bearings 56. Pinion gear 58, which engages stripper ring gear teeth 50, is fitted with clutch 60. The pinion gear and clutch are fitted over the pinion into engagement with the stripper ring gear teeth. The rear portion of pinion 52 also has a gear tooth configuration 62 or a separate gear mounted on the pinion which is engaged with a gear rack 64 used to initiate rotation of the stripper ring 36, as shown by arrow B in FIG. 2 and to move stripper ring 36 to its forward position as shown in FIG. 2, and as shown by arrow A in FIG. 1 to move stripper ring 36 to its rearward position as shown in FIG. 1. Thus, rack 64 and pinion 52 function to transfer power to stripper ring 36. Front and rear bearing plates 38 and 40, respectively, adjoin fixed core plate 39 in the mold closed position shown in FIG. 1 and are spaced therefrom by space 90 in the mold open position shown in FIG. 2.

Figure 3:
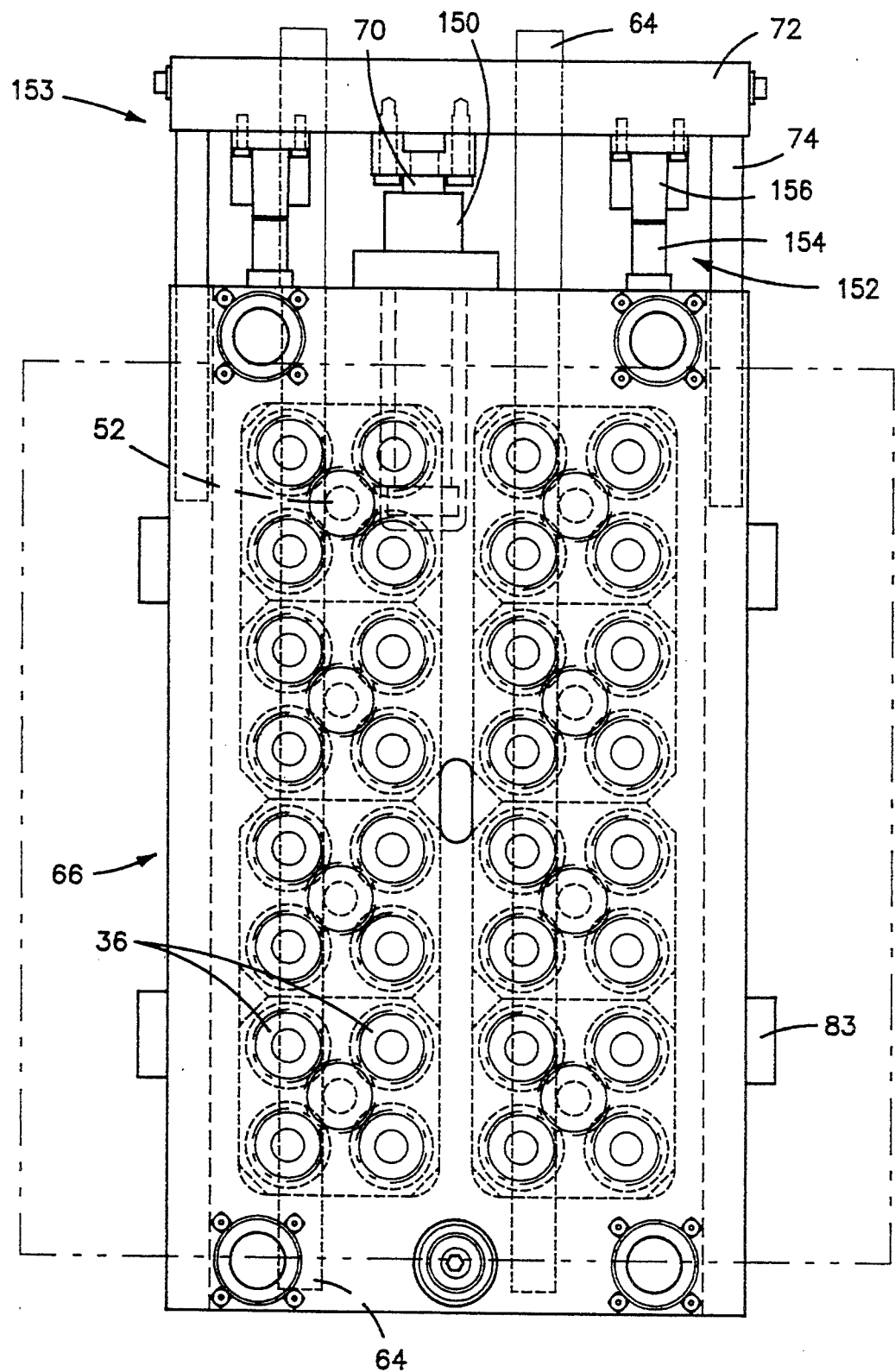
FIG. 3 is a front elevational view of a 32 mold cavity layout using the assembly of FIG. 1 and showing a camming mechanism for actuating the same, in accordance with the principles of the present invention.

FIG. 3 shows a front view of a representative mold cavity assembly 66 using the assembly of FIG. 1 wherein rack 64 is placed vertically through the mold cavity assembly 66, engagable with multiple pinions 52, which in turn are engagable with four stripper rings 36 each. It is naturally possible to vary this arrangement based on particular requirements, for example, the pinion can engage only one or two or more stripper rings, based on the size variables of the molded article, pinion, stripper ring and mold layout. Other means known in the art may be used to rotate the pinions or stripper rings.

The rack 64 and cylinder rod 70 are attached in assembly using cross-member 72. Also, attached to cross-member 72 is cam 74. FIG. 3 shows the cylinder rod 70 in the retracted position with the racks pulled down. Movement of the cam 74 and rack 64 together provide the correct timing of forward and rotational motion for the given molded article 14 and thread pitch thereof.

Figure 4:
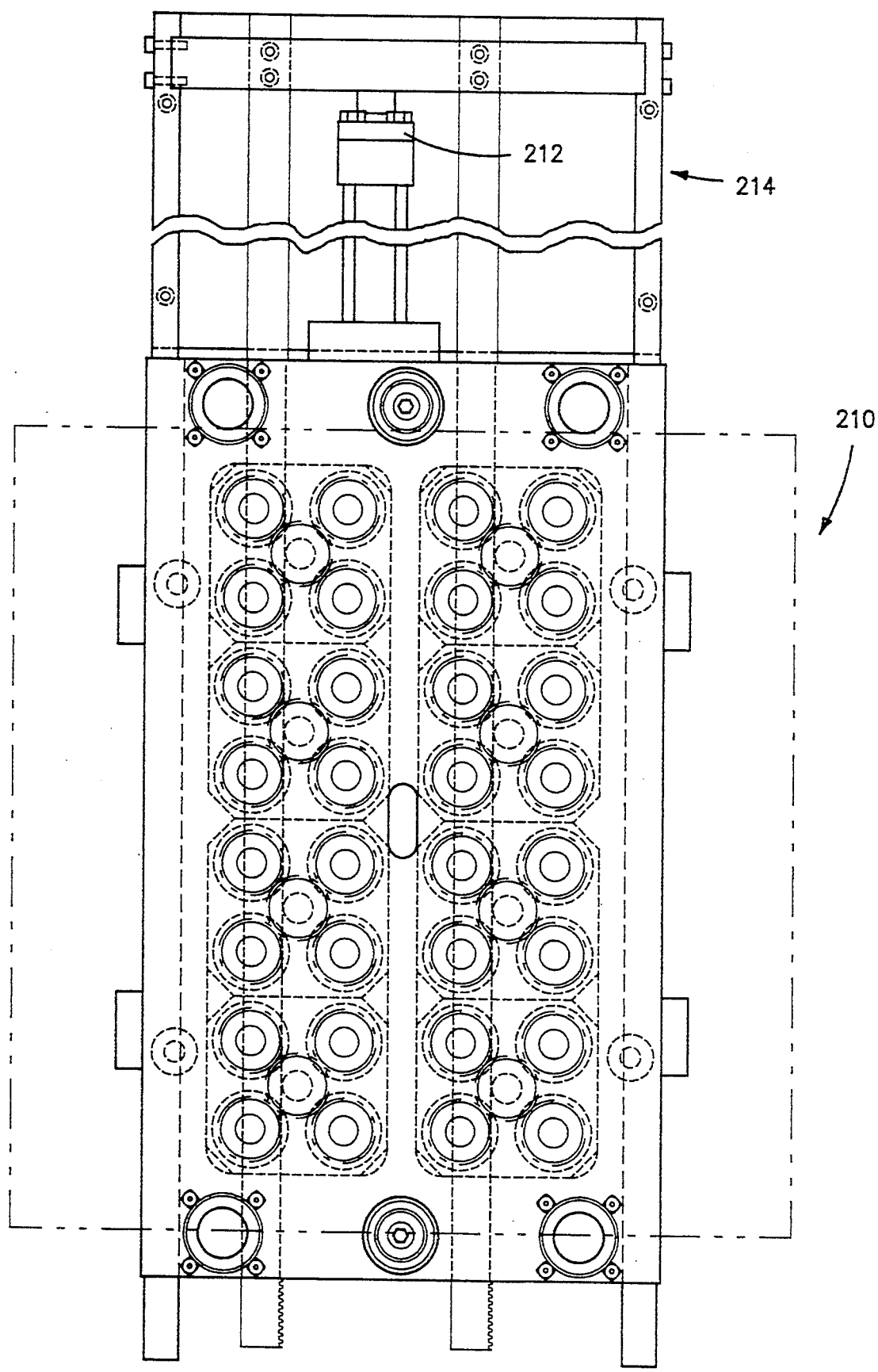
FIG. 4 is a front view of a 32 mold cavity layout using a single power source and not including the camming mechanism of FIG. 3.

Referring still to FIG. 3, racks 64 are reciprocated by two sources, an initial source which is camming mechanism 152, which is driven by motive means 34 (shown in FIG. 1), for the first quarter of the ejection process, and a secondary source, which is a pneumatic cylinder 150, for the remaining three quarters of the ejection process. Camming mechanism 152 functions to initiate the ejecting process by breaking the molded articles loose from the mold cavity, while the cylinder 150 completes the ejection process by continuing the rotation of the article after the initial break. FIG. 4 shows an example of a system 210 using only one power source, a hydraulic cylinder 212, for the entire ejection process. Due to the need for a strong initial breaking force for overcoming the sticking of the molded article to the mold, a large and forceful hydraulic cylinder 212 is used. Hydraulic cylinder 212 provides force after the initial break which is usually excessive for the remaining portion of the ejection process. However, with camming mechanism 152, the smaller pneumatic cylinder 150 can be used which, as shown in FIG. 3, occupies much less room and allows the top portion 151, to be much smaller in scale, particularly height, than a similar top portion 214 shown in FIG. 4, necessarily using much larger cylinder 212.

As shown in FIGS. 5a–5d, camming mechanism 152 includes a cam 154 and a cam following mechanism 156. Cam 154 is bolted or otherwise connected to movable mold cavity plate 100 and mold manifold plate 101. Cam 154 extends substantially horizontally over core plate 39 and may extend with the mold in the mold closed position over machine moving platen 103. Cam following mechanism 156, comprised of roller 153 and bracket 155, is attached via the bracket 155 and fasteners or the like, to the lower surface of cross-member 72. Cross member 72 is fastened to racks 64 (see FIG. 3) and vertical cams 74, which function to turn article 14 out of female mold 11 and separate plates 38 and 40 from core plate 39, respectively. With the attachment of racks 64 (see FIG. 3) and cam 74 to cross-member 72, the movement of cam following mechanism 156 along cam 154 effectuates motion to both elements, cam 74 and racks 64.

Figure 5A:
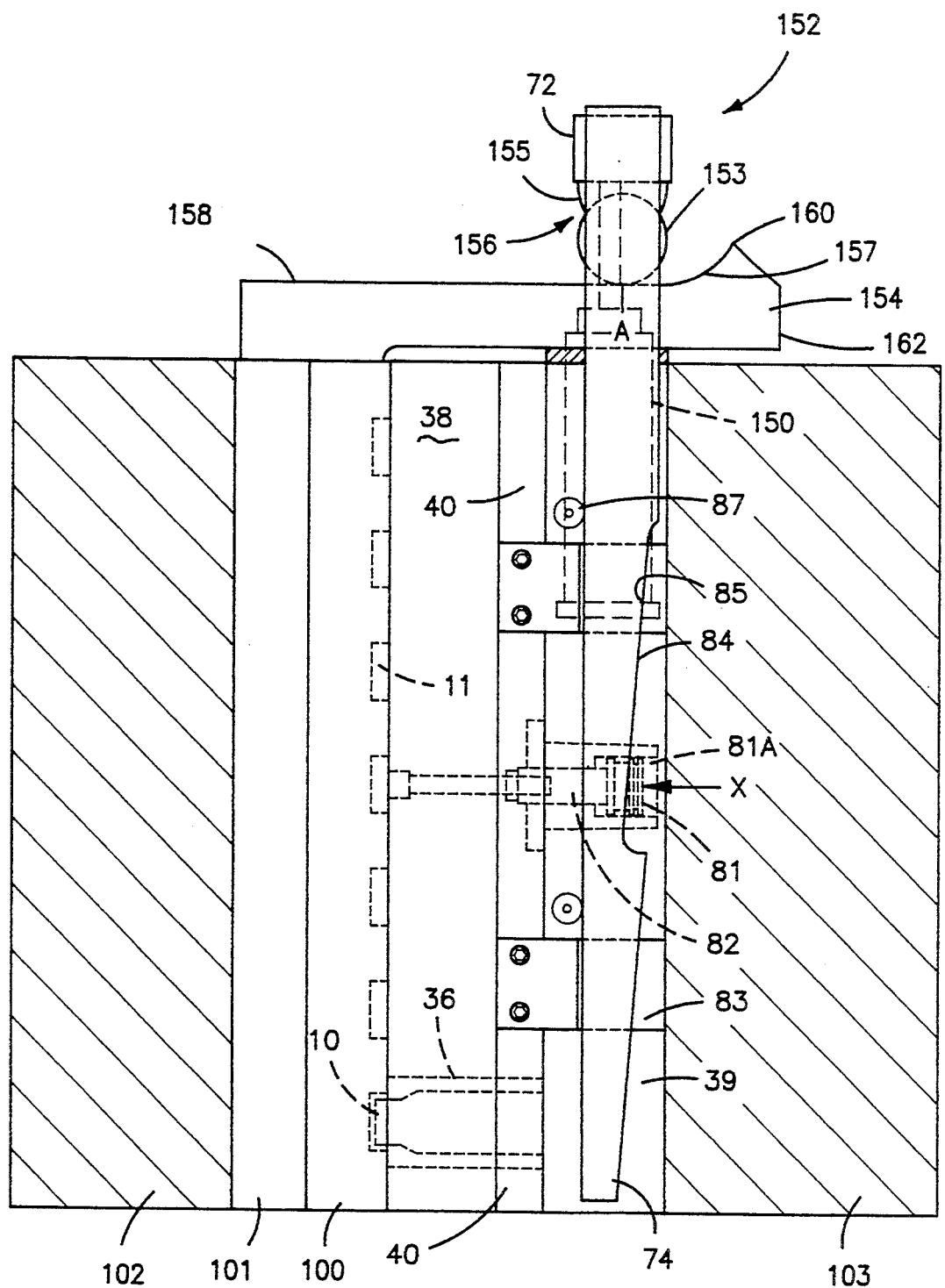
FIG. 5a is a side elevational view of the mold in a mold closed position showing the camming mechanism used for assisting and ejecting the molded article.
Figure 5B:
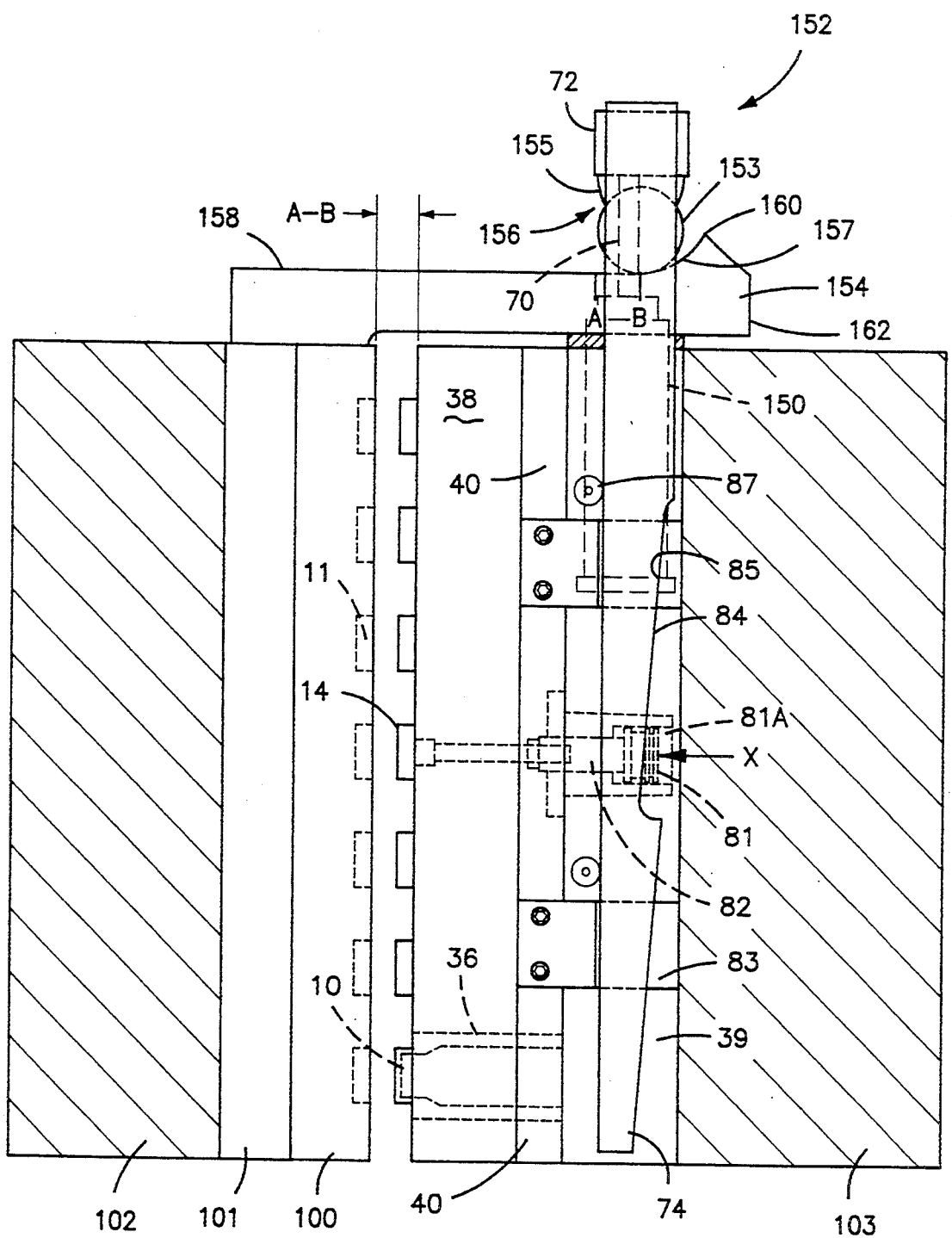
FIG. 5b is similar to FIG. 5a, wherein the mold is starting to open and a cam following mechanism is functioning to assist in initiating the ejection process.
Figure 5C:
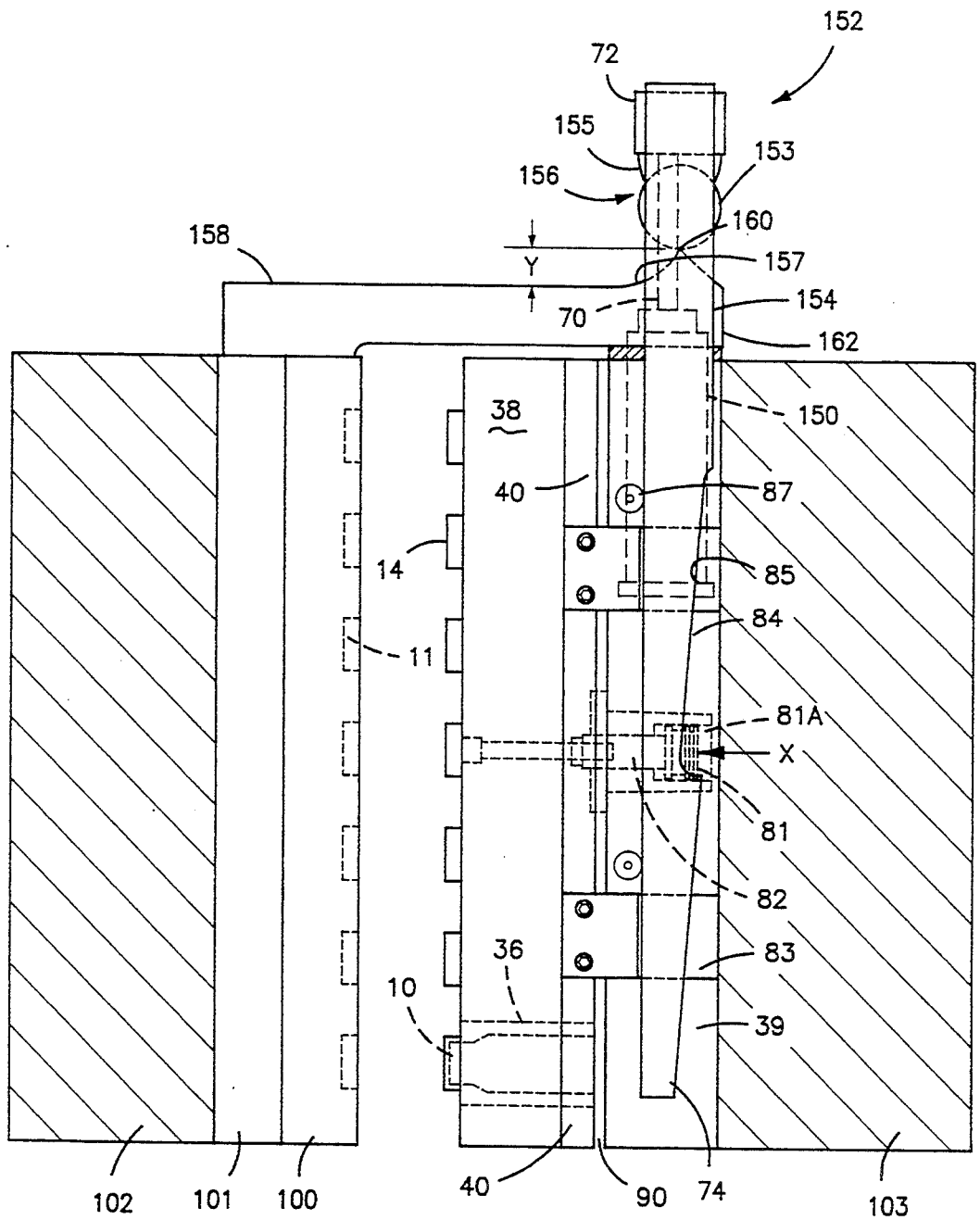
FIG. 5c is a view similar to FIG. 5b wherein the mold is in the open position and the cam following mechanism has completed movement for the initial ejection process.
Figure 5D:
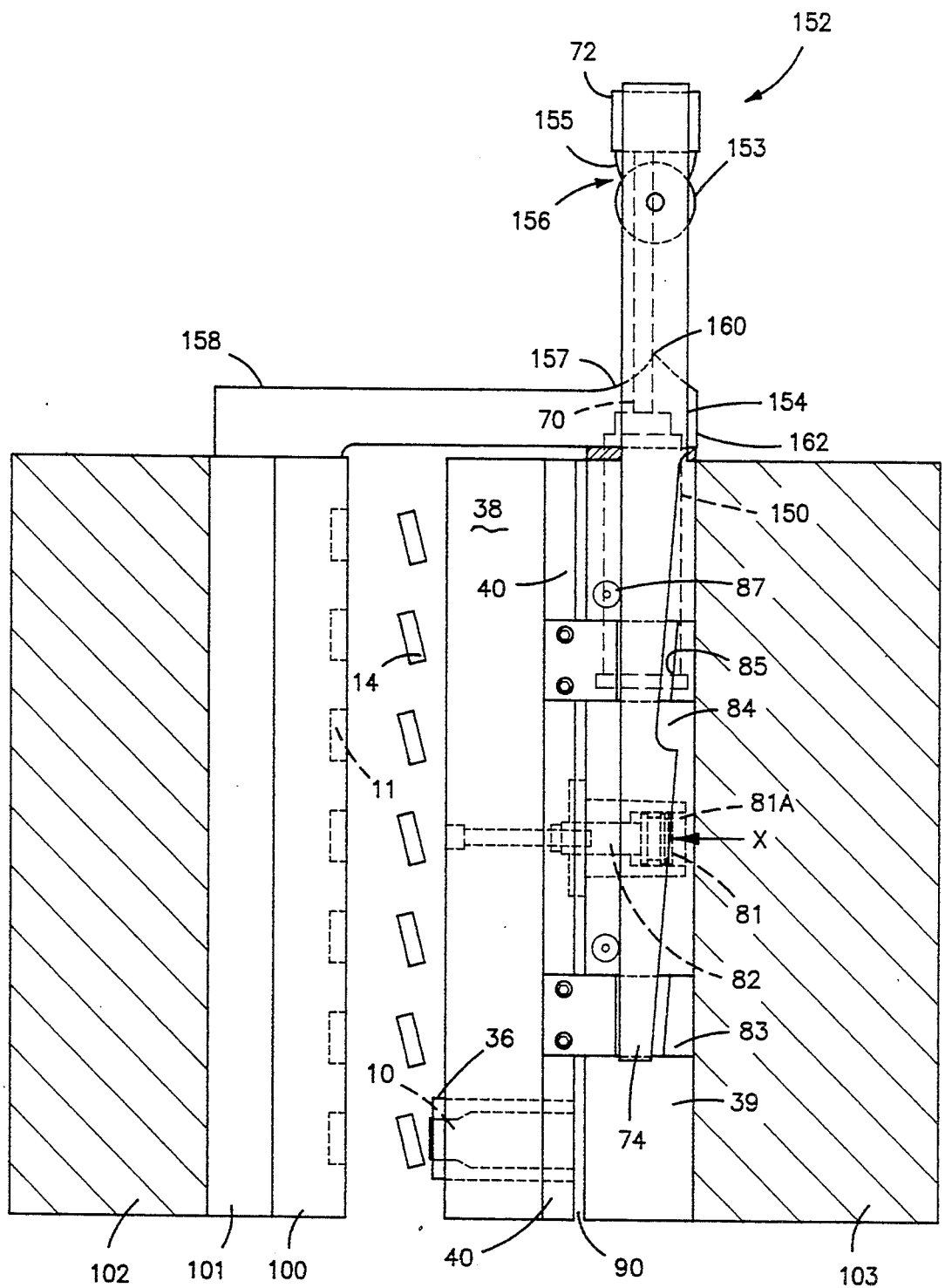
FIG. 5d is a view similar to FIG. 5c with the mold in the open position, showing a cylinder providing power for completing the ejection process.

In the mold closed position, as shown in FIG. 5a, cam following mechanism 156 rests on the horizontal portion of cam surface 158 of cam 154 immediately adjacent inclined surface 157. Referring to FIG. 5b, at about the ¾ length point of surface 158, the cam begins to extend angularly upward via inclined surface 157 to a rounded peak 160, which peak 160 is adapted to be moved into alignment with cylinder 150 and cylinder rod 70, during movement of cam 154 and plate 101. Cam surface 158 then continues downward on an angle to a distal edge 162. The height and angular configuration of inclined surface 157 of cam 154 leading to peak 160 is designed such that camming mechanism 152, following this surface, functions to move rack 64 (see FIG. 3) a distance which turns stripper ring 36 approximately 45°. Referring to FIG. 5c, the force applied during this 45° displacement is sufficient to initially break molded article 14 from core 10. When peak 160 is reached by cam following mechanism 156, piston 150 takes over and completes the upward motion of cam following mechanism 156, driving rod 70, cross member 72 and racks 64 (not shown) upward, rotating the stripper ring (not shown) and ejecting molded articles 14, as shown in FIG. 5d.

Figure 7:
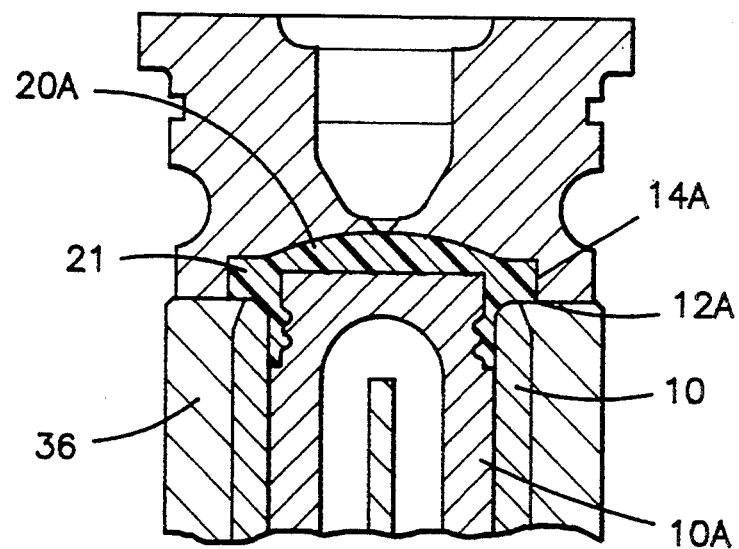
FIGS. 6 and 7 are partial sectional views of alternate embodiments.
Figure 6:
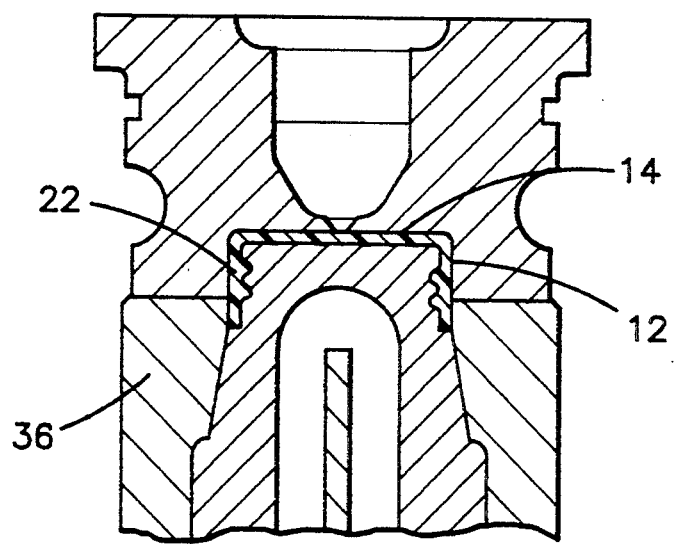

In operation, once the plastic has been injected and solidified, as shown in FIG. 1, the mold opens via motive means 34 to move female mold 11 away from mold core 10, as shown in FIG. 2, and the mold assembly 1 assumes the mold open position with the molded article 14 remaining on the core. As shown in FIG. 1, stripper ring 36 preferably forms a part of the base of mold cavity 12 in the mold closed position and contacts the base of the skirt 22 of molded article 14. Alternatively, as shown in FIG. 6, stripper ring 36 may form a part of the side of mold cavity 12 and contact the side of skirt 22 of molded article 14. The stripper ring removes the article by inward pressure thereon due to the angular configuration of the forward portion of the stripper ring adjacent the molded article, alternatively assisted by air pressure. A further alternate embodiment is shown in FIG. 7, wherein molded article 14A includes an upper portion 20A with an outer flange portion 21. In this embodiment, stripper ring 36 forms a part of mold cavity 12A adjacent flange portion 21 and removes the molded article 14A by pressure on the flange portion 21. Core 10 may optionally include core sleeve 10A which facilitates manufacturing of the core section.

FIGS. 5a–5d show side views of the layout of FIG. 3 in various stages of operation. The rack 64 (shown in FIG. 3), cam 74 (both associated with camming mechanism 152 and pneumatic cylinder 150) and fixed pneumatic piston 82 (see the enlarged detail views of FIGS. 8 and 9) are then activated simultaneously to turn the pinion 62 (see FIG. 3) and stripper ring 36 and advance stripper ring 36 forward at a predetermined rate governed by the angle of cam face 84 as it slides against cam 83.

Initially, the turning of pinion 52 (see FIG. 3) and advancement of stripper ring 36 is effected by camming mechanism 152, as shown in FIGS. 5a and 5b. By using the opening force of motive means 34 (see FIG. 1), the upward movement of camming mechanism 152 functions to initiate the ejection of the molded article 14 from mold core 10. Because the initial breaking of article 14 from female mold 11 requires a greater force than the subsequent ejection procedure, pneumatic cylinder 150, which provides less force than the camming mechanism 152, can be used to finish the ejection process. If desired, a hydraulic cylinder may be employed with the advantage of additional reduction in size.

Camming mechanism 152 is designed so that there will be no vertical lift imparted to cam following mechanism 156, rack 64 (see FIG. 3) and cam 74, and consequently no rotation of stripper ring 36, until the mold has opened a sufficient distance. This distance is indicated as A-B in FIG. 5b and is such that the threaded molded article 14 will not begin turning away from mold core 10 for subsequent ejection until it has been cleared away from female mold 11.

As the motive means begins to move the female mold away from mold core 10, the horizontal surface of cam 154 begins to move underneath cam following mechanism 156, as shown in FIGS. 5a–5c. However, power is not transferred via racks 64 and pinions 52 until cam following mechanism 156 is directed up inclined surface 157, as shown in FIG. 5b. That is, the movement of cam 154 does not impart vertical movement to cam following mechanism 156 until plates 38 and 100 have separated distance A-B so as to enable article 14 to freely fall between plates 38 and 100. The actual ejection process is initiated by the power of motive means 34 (see FIG. 1) when cam following mechanism 156 is forced up inclined surface 157.

As plates 38 and 100 continue to separate, inclined surface 157 directs cam following mechanism 156 upward to initiate movement of vertical cam 74 and rack 64 (see FIG. 3). One result of the upward movement of cam following mechanism 156, is that rack 64 imparts rotation to stripper ring 36 which subsequently imparts rotation to molded article 14.

As shown in FIG. 5c, cam following mechanism 156 moves to the maximum vertical peak 160, which motion causes approximately the first 45° of rotation of molded article 14. At the same time or immediately following the lifting initiated by the camming mechanism 152, cylinder 150, having cylinder rod 70 attached to center cross-member 72, is actuated for completing the ejection process. Accordingly, and referring to FIG. 5d, lift cylinder 150 continues the momentum generated by camming mechanism 152 and fully extends stripper ring 36, thereby ejecting molded articles 14. As a consequence of camming mechanism 152 performing the most forceful function of the ejecting process, the initiation of the rotation of stripper ring 36 and overcoming any sticking or gripping of molded article 14 to core 10, cylinder 150 can be more compact and arranged in more space efficient manner than previously obtainable with similar ejection mechanisms.

While camming mechanism 152 has been described for use with a stripper ring, this supplementary force actuating mechanism may be used with other types of molds and ejection systems which rotate the core portion of the mold instead of using a stripping ring. Even more broadly, the supplementary camming mechanism can be used with any ejection system which reciprocates racks or cams and could benefit from a boost in starting the ejection motion.

Referring still to FIGS. 5a–5d, the effect of pneumatic piston 82 is to hold cam face 84 in contact with cam 83. Cam 83 is fixed to the rear bearing plate 40 as shown in FIGS. 4 and 5a. This action serves to control the unscrewing of article 14 from mold core 10. FIG. 2 shows stripper ring 36 in its forward position with article 14 released from core 10 by rotation thereof in the direction of arrow C. The stripper ring and mold can now be returned to their mold closed position independent of the rack and cam following mechanism as shown in FIGS. 5, saving time in the operation. If the pneumatic piston 82 has not been energized to move the stripper ring back before the mold closes, no damage will occur due to the compressive spring nature of the pneumatic piston 82. As the rack-cam assembly moves back to its home position, clutch 60 allows the stripper ring to remain stationary without rotation thereof and without the resultant wear between gear teeth or mold shut-off surfaces 76, 78.

Figure 8:
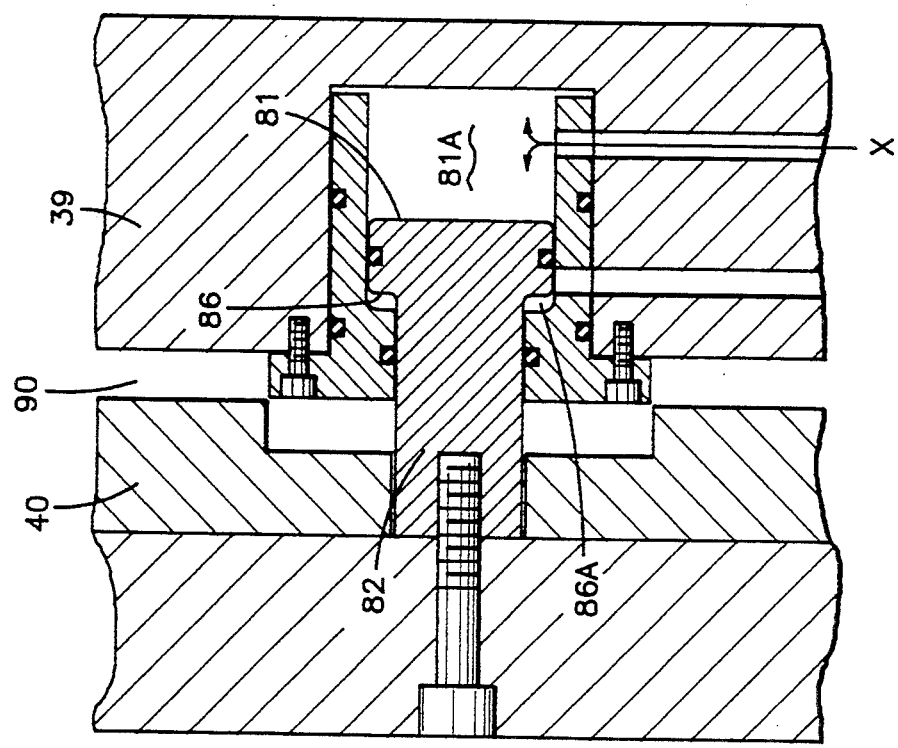
FIG. 8 and 9 are enlarged detail views of the piston arrangement for moving the front and rear bearing plates.
Figure 9:
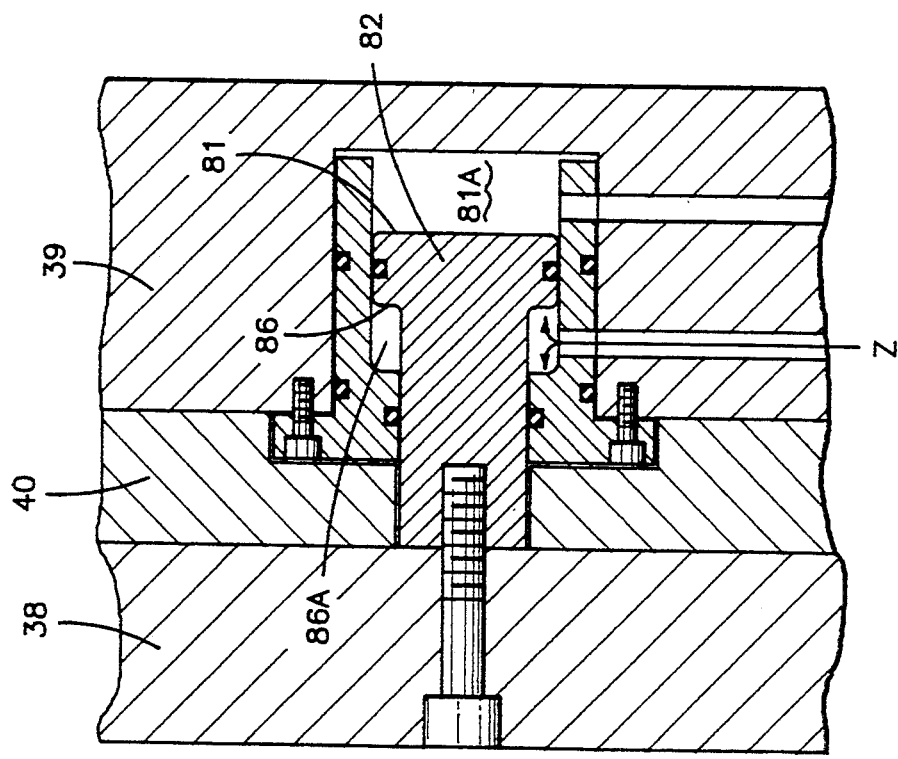

The operation and detail of piston 82 and cam 74 will be described below. Since the stripper ring 36 is supported and held between bearing plates 38 and 40, it is necessary to move these two plates away from core plate 39 in timed relationship with the rotation of the stripper ring 36 to eject the molded article, as shown in FIGS. 5c and 5d. To achieve this, air pressure is supplied to first face 81 of fixed piston 82 in the direction of arrow X into chamber 81A which adjoins first face 81, see FIG. 8. The air pressure in the direction of arrow X acts on bearing plates 38 and 40 and moves plates 38 and 40 away from fixed core plate 39, see FIG. 5c, enlarging chamber 81A as shown in FIG. 8. However, the movement is restricted by face 84 of cam 74 which is associated with plate 39 and face 85 of cam 83 which is associated with plate 40. As cam 74 moves upwardly in the direction of arrow Y as shown in FIGS. 5c–5d, inclined face 84 of cam 74 permits separation of plates 38 and 40 from plate 39, with space 90 between these plates. The angle of cam face 84 and cam face 85 is designed such that the vertical distance moved by rack 64 (and consequently cam 74) to produce exactly one rotation of stripper ring 36, one quarter of which is initiated by camming mechanism 152, will also permit a horizontal movement of cam 83 and therefore to stripper ring 36 equal to the pitch of the thread on the molded article 14. At the end of the stroke, the parts will have fallen off and the mold is ready for closing. Air pressure is then switched to second face 86 of piston 82 in the direction of arrow Z into chamber 86A urging plates 38 and 40 towards plate 39 as shown in FIG. 9 by enlarging chamber 86A and moving plates 38 and 40 in the opposite direction, as shown in FIG. 9 and 5a. This can be done when the mold is closing as the cam and cam faces are not restricted from separating and are independent in this direction of motion. Therefore, it is not necessary to wait for cam 74 to return to the original position. This should be contrasted to the usual method of using a cam to push the plate mechanically forward by wedging itself between two plates. Of course, in that device, it would be mandatory to wait for the cam (wedge) to be repositioned to allow the return of plate 38 and 40 for the closing operation of the mold to commence. Rollers 87 are used to provide back-up support for the cams.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A molding device for forming a molded article and ejecting the molded article therefrom, said device comprising:
   a first mold half having a mold surface for forming said molded plastic article;
   a second mold half having a mold surface cooperating with the mold surface of said first mold half to form a mold cavity therebetween in a mold closed position;
   means for injecting plastic material into said mold cavity;
   motive means for causing relative motion between said first mold half and said second mold half to space said first mold half from the molded article and said second mold half to form a mold open position;
   a movable ejection means for breaking said article loose from said mold surface of said second mold half and for ejecting said article from said mold surface of said second mold half while in said open position, said ejection means positioned adjacent said second mold half and adapted to be placed into contact with said article;
   ejection moving means for transmitting rotational power to and causing motion of said movable ejection means, said ejection moving means connected with said movable ejection means and positioned adjacent said movable ejection means;
   initial source means for converting said relative motion into power for powering said ejection moving means, said initial source means providing power sufficient to enable said movable ejection means to break said article loose from said mold surface of said second mold half; and
   secondary source means for powering said ejection moving means, said secondary source providing sufficient power to enable said movable ejection means to finish the ejection of said article after said article is broken loose from said second mold half.

2. The molding device according to claim 1, wherein said initial source means comprises a cam connected with said first mold half and a cam following mechanism connected with said ejection moving means, said cam connected with said first mold half adapted to move relative to said cam following mechanism and impart motion to said cam following mechanism for energizing said ejection moving means during the separation of said first and second mold halves.

3. The molding device according to claim 2, wherein said ejection moving means comprises a rack and pinion, said rack being connected on one end with said cam following mechanism and on another end with said pinion, said pinion engaged with said movable ejection means.

4. The molding device according to claim 3, wherein said ejection means is a rotatable stripper ring adapted to rotate said article loose from said second mold half, said pinion engaging said stripper ring for inducing rotation to said stripper ring.

5. The molding device according to claim 2, wherein said cam following mechanism is adapted to move an element of said ejection moving means in a first direction and said secondary source means is adapted to move said element in said first direction substantially subsequent to said cam following mechanism.

6. The molding device according to claim 5, wherein said cam extends in a direction which traverses said first direction, said cam having an inclined surface extending to a peak, wherein said cam following mechanism is adapted to follow said cam to said peak.

7. The molding device according to claim 6, wherein said article becomes loosened from said second molding surface when said cam following mechanism reaches said peak, said secondary source means adapted to energize at least when said cam following mechanism reaches said peak for enabling said ejection means to complete the ejection of said article.

8. The molding device according to claim 5, wherein said secondary source means is a cylinder having a cylinder rod movable therein, said cylinder rod being connected to and in alignment with said cam following mechanism and positioned and movable in said first direction, said cylinder positioned in said second mold half.

9. The molding device according to claim 1, wherein said second mold half is a mold core;
   said article has a threaded inner portion and said molding surface of said mold core is adapted to form said threaded inner portion; and
   said ejection means is a rotatable stripper ring positioned adjacent said mold core, wherein said stripper ring forms part of the molding surface and rotates said article loose from said second mold half for ejecting said article after said first mold half is separated from said mold core.

10. The molding device according to claim 1, wherein said secondary source means is operable to provide power to said ejection moving means after said article has been broken from said second molding surface, said secondary source means adapted to impart motion to said ejection moving means along the same direction as said initial source means.

11. The molding device according to claim 10, wherein said secondary source means is a fluid actuated cylinder.

12. The molding device according to claim 1, wherein said first mold half is a female mold and said second mold half is a mold core having an external core surface cooperating with said female mold to form said mold cavity therebetween in the mold closed position, and said ejection means is a movable rotatable element positioned adjacent said mold core which forms part of the molding surface and ejects said article after separation of said female mold from said mold core, wherein said rotatable element means is adapted to eject said article by rotating said article off of said mold core.

* * * * *